Oct. 13, 1936.　　　　A. DAVIS, JR　　　　2,057,015
BUMPER CONSTRUCTION FOR VEHICLE TANKS
Filed Nov. 23, 1934　　　3 Sheets-Sheet 1
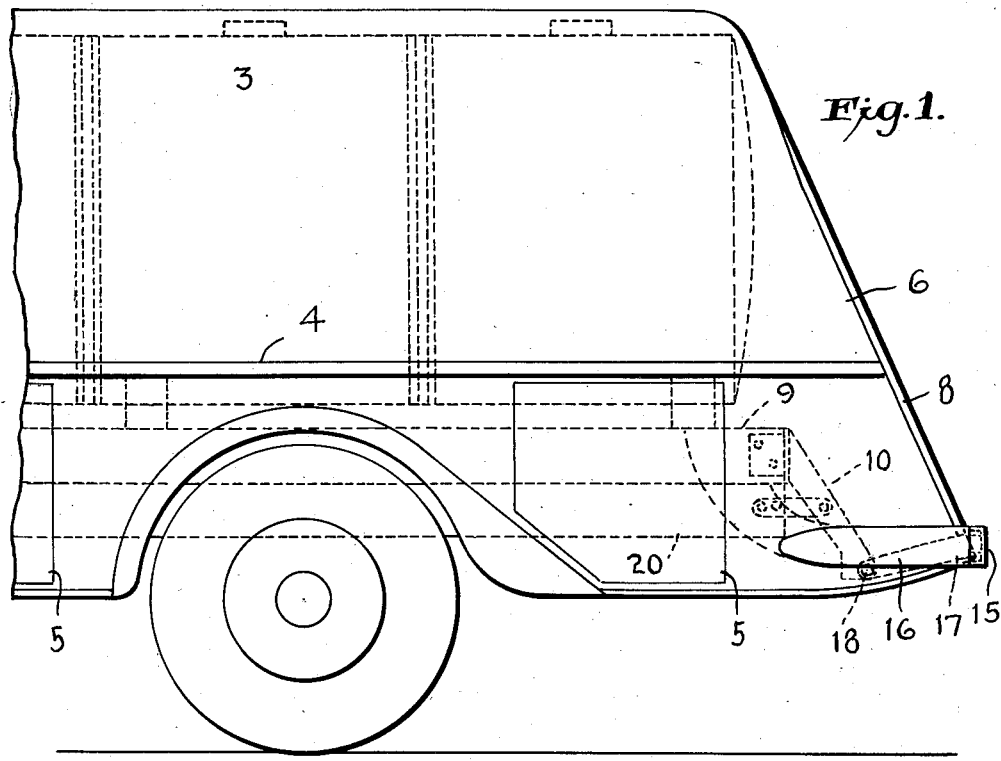
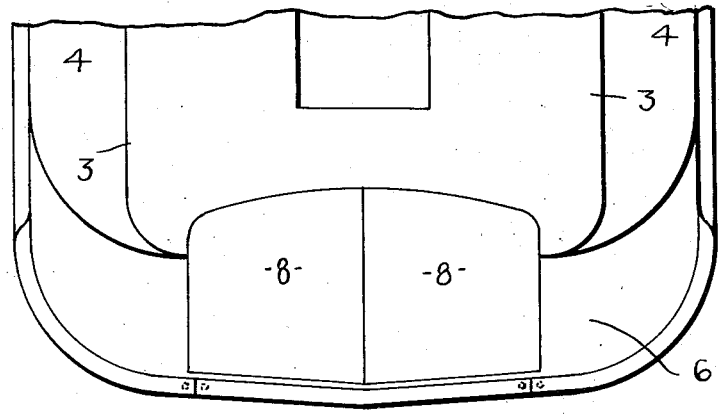
INVENTOR
Augustine Davis, Jr.
BY
ATTORNEY Oct. 13, 1936.    A. DAVIS, JR    2,057,015
BUMPER CONSTRUCTION FOR VEHICLE TANKS
Filed Nov. 23, 1934    3 Sheets-Sheet 2
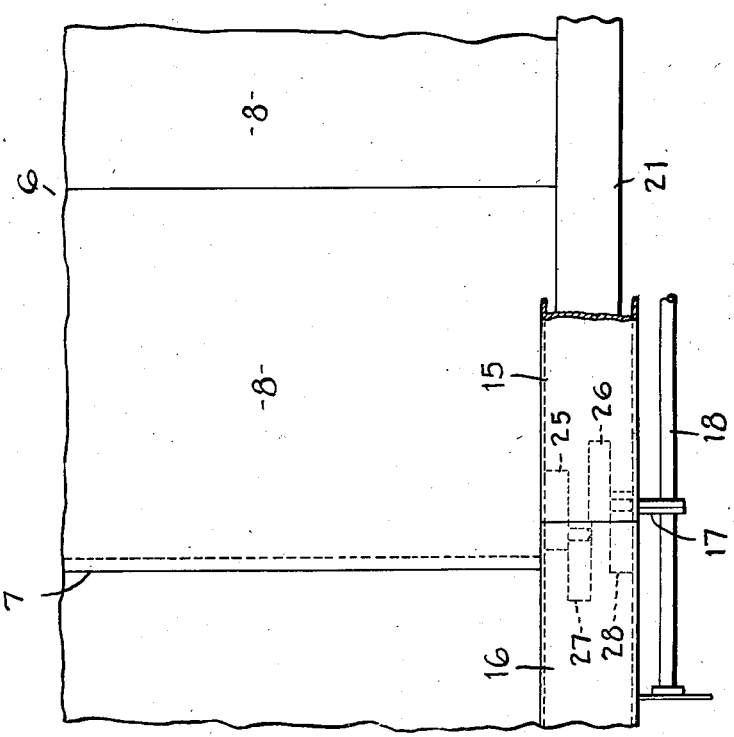
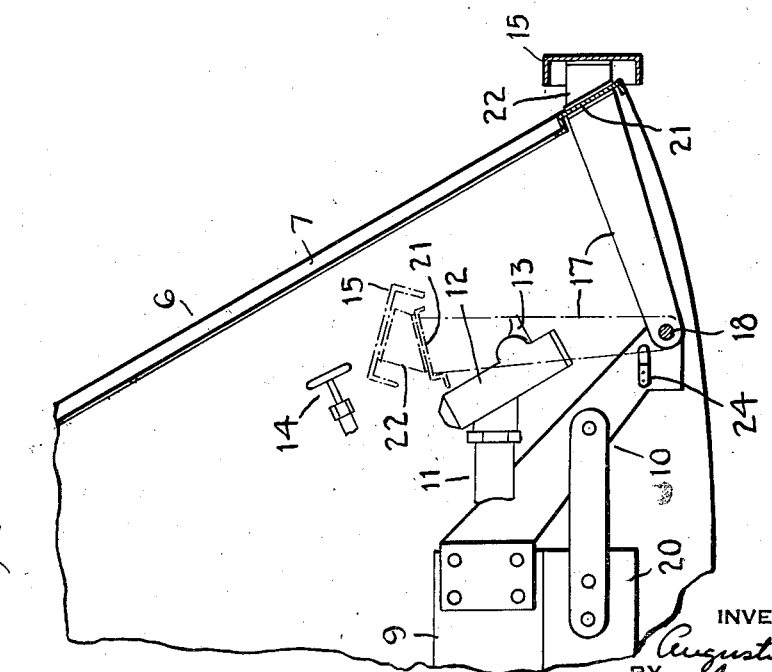
INVENTOR
Augustine Davis, Jr
BY
ATTORNEY

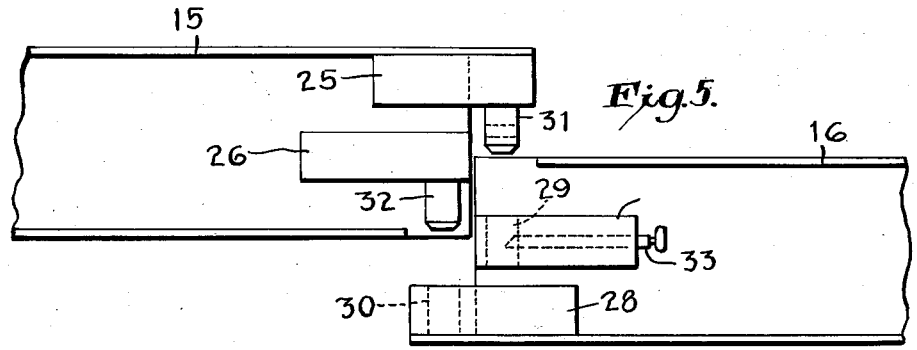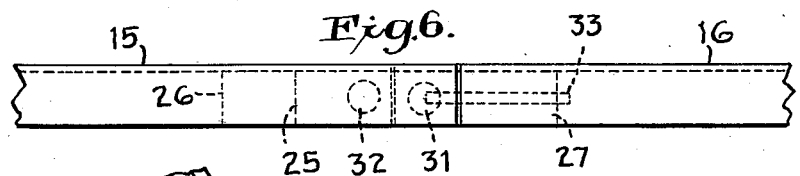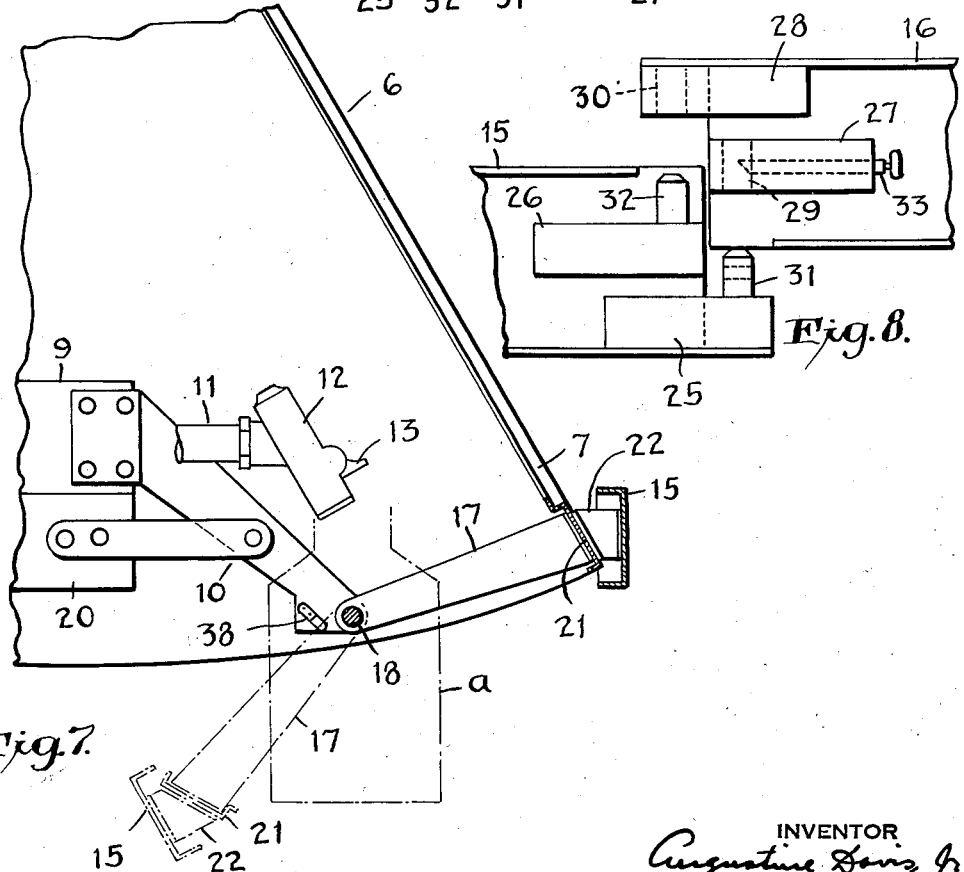

Patented Oct. 13, 1936

2,057,015

UNITED STATES PATENT OFFICE 2,057,015

BUMPER CONSTRUCTION FOR VEHICLE TANKS

Augustine Davis, Jr., Cincinnati, Ohio

Application November 23, 1934, Serial No. 754,426

1 Claim. (Cl. 280—5)

This invention relates to vehicle tanks or tank vehicles, such as truck tanks or trailer tanks, and more especially to matters involving the bumper protection at the rear end of the tank or tank unit. The invention is particularly applicable to streamline tank body constructions or to any construction in which it is necessary to dispose the bumper close to the bucket box or other rear end housing.

The object of the invention is to provide a construction which is simple and strong and convenient to operate, and with which the bumper can be moved out of the way notwithstanding its proximity to such housing.

In the accompanying drawings forming part hereof:

Fig. 1 is a side elevation of a rear portion of a tank vehicle in which the invention is embodied;

Fig. 2 is a partial plan view;

Fig. 3 is a fragmentary, vertical, longitudinal section through the rear-end housing, showing the parts inside;

Fig. 4 is a fragmentary rear elevation;

Fig. 5 is a fragmentary view looking at the inside of the adjoining portions of the movable bumper section and one of the stationary bumper sections, the movable bumper section being shown slightly raised;

Fig. 6 is a plan view of the construction shown in Fig. 5;

Fig. 7 is a view similar to Fig. 3, but showing a modification in which the movable bumper construction swings downward; and Fig. 8 is a view similar to Fig. 5, but illustrating a reversal of locking parts which permits the bumper to swing down.

The truck tank 2 partially illustrated in the drawings is one having shields 3 which streamline the top of the tank, or the top and sides of the tank above the side running boards 4, beneath which there are compartment structures 5. Extending rearward from the rear end of the tank there is a box or housing 6 having a sloping back in which there is a door opening 7 closed by a door or doors 8. This housing is of sheet-metalwork and is united or continuous with the walls of the tank body, in addition to which it may be braced from the sills 9 of the body mounting and/or the chassis sills 20 by bracing indicated at 10.

In the tank body shown in the drawings, the housing encloses piping 11, through which liquid is delivered from the tank compartments. The pipes from the individual compartments terminate in faucets 12, only one of which is shown, having hooks 13 on which buckets can be hung to receive the discharge. The piping may be manifold in accordance with known practice, in order to deliver liquid from any one or more of the compartments through a common outlet or through a hose, and the numeral 14 indicates the position of a handle of a valve used in connection with a manifold. The bottom of the housing 6 may be left open, or it may be provided with a bottom hinged to drop downward and forward.

A bumper 15 extends across close behind the rear lower extremity of the housing 6. This bumper is movable, and in addition there are preferably side bumpers or bumperettes 16, which are stationary. The bumpers 15 and 16 may be termed bumper sections. The curved stationary sections 16 are united to the fixed walls of the housing 6, and may be directly braced by the bracing 10. Their rear ends terminate near the door opening 7. When the movable section 15 is in its ordinary position, protecting the rear end of the tank unit, its ends are contiguous and in line with the ends of the sections 16, so that the sections 15 and 16 then constitute in effect a bumper extending across the back and curving forwardly around the sides of the housing.

The movable bumper 15 is secured to the rear ends of arms 17 which extend forward inside the housing 6 and are pivoted on a hinge rod 18, the ends of which are carried by the bracing 10, which in turn is fastened to the tank mounting sills 9 or the chassis sills 20, or to both. To the hinged arms 17, there is also secured a transverse member 21, which forms the lower sill of the door opening 7. The parts 15 and 21 are united together by pieces 22. Thus, both of the parts 15 and 21 are movable and preferably they are movable as a unit.

In the construction shown in Figs. 1 to 6, the bumper 15 and the member 21 can be swung upward and forward through the door opening into the interior of the housing 6, and the hinged arms 17 are of such length and they and the hinge axle 18 are so arranged that when the bumper construction is thus moved out of the way, and when it is in the raised position shown in broken lines in Fig. 3, it clears any piping, such as the faucets 12 and the valve 14. A catch or catches 24 may be provided to hold the bumper construction in such raised position.

In order to support the movable bumper device in its lowered or protecting position, blocks 25 and 26 are affixed to the inner or front side of the movable bumper section 15, adjacent each end thereof, the upper block 25 projecting beyond the end of this movable bumper. Other blocks 27 and 28 are secured to the inner or front side of the stationary bumper sections 16, adjacent their rear ends. The blocks 27 and 28 have vertical holes 29 and 30 and the blocks 25 and 26 have downwardly projecting pins 31 and 32 which enter the said holes. In this manner the movable bumper will be positioned and retained in normal position so that, in addition to the support provided by the arms 17, the hinge rod 18 and the supporting arms 19, the movable bumper receives support from the pin and hole interengagement between the blocks 25, 26 and the blocks 27, 28, to enable the bumper to withstand any shock due to collision. Since the blocks 25 and 26 rest on the blocks 27 and 28, and since the doors 8 when closed fit close to the sill 21 and thus keep the movable bumper construction from rattling, it is not absolutely necessary to provide any other means for securing the movable bumper against upward movement. Nevertheless, a slidable retaining pin 33 may be provided at each joint to engage and hold one of the pins 31, 32.

In the construction shown in Figs. 7 and 8, the movable bumper and door sill can swing downward and forward below the housing 6, to a position in front of a suspended bucket a, in which position the unit may be held by a catch 38.

The elements of construction being the same as that already described, similar parts are designated by like reference characters. Because the bumper moves down out of the way, instead of being raised out of the way, the relations of the blocks 25, 26, with their pins 31, 32, and the blocks 27, 28, with their holes 29, 30, is reversed. In this construction, catches, for example such as the pins 33, are required to keep the bumper from dropping.

I claim:

In a tank vehicle having a rear-end housing provided with a door, a bodily movable sill for said door, a bodily movable bumper section, swinging arms carrying said sill and said movable bumper section, fixed side bumper sections, and blocks secured to the contiguous portions of the fixed and movable bumper sections and having interfitting formations.

AUGUSTINE DAVIS, Jr.